United States Patent [19]

Wilson

[11] Patent Number: 5,271,352

[45] Date of Patent: Dec. 21, 1993

[54] METHOD OF CONSTRUCTION OF A BOAT HULL

[75] Inventor: John A. Wilson, South Fremantle, Australia

[73] Assignee: Critical Sciences, (Australia) Limited, Pepperment Grove, Australia

[21] Appl. No.: 613,887

[22] PCT Filed: Jun. 1, 1989

[86] PCT No.: PCT/AU89/00243

§ 371 Date: Sep. 23, 1991

§ 102(e) Date: Sep. 23, 1991

[87] PCT Pub. No.: WO89/11995

PCT Pub. Date: Dec. 14, 1989

[30] Foreign Application Priority Data

Jun. 8, 1988 [AU] Australia ................................ PI8684
Jun. 8, 1988 [AU] Australia ................................ PI8685

[51] Int. Cl.$^5$ ............................................. B63B 5/24
[52] U.S. Cl. ..................................... 114/359; 114/357; 264/554
[58] Field of Search .............. 114/357, 359; 264/500, 264/544, 554

[56] References Cited

U.S. PATENT DOCUMENTS

| | | | |
|---|---|---|---|
| 2,440,499 | 4/1948 | Ames et al. | 264/544 |
| 3,153,796 | 10/1964 | Stahmer | 114/359 |
| 3,655,320 | 4/1972 | Heavener | 264/554 |
| 4,021,874 | 5/1977 | Alter et al. | 114/357 |
| 4,975,236 | 12/1990 | MacLachlan | 264/554 |

Primary Examiner—Michael S. Huppert
Assistant Examiner—Thomas J. Brahan
Attorney, Agent, or Firm—Handal & Morofsky

[57] ABSTRACT

This invention relates to a method of boat hull construction. The method comprises mounting a former having an external configuration conforming to the internal configuration of the hull to a vacuum forming bed, heating a sheet of thermo-plastic material, supporting the heated sheet above the former by supporting one side of the sheet material on a first frame member, and supporting the opposed sides of the sheet to each side of the one side from a pair of second frame members. The second frame members are pivotally mounted to the first frame member about an axis perpendicular to the plane of the sheet material. On lowering the sheet over the former air is extracted from the space between the former and sheet material.

16 Claims, 7 Drawing Sheets

METHOD OF CONSTRUCTION OF A BOAT HULL

This invention relates to boat construction and in particular the construction of a boat hull utilising thermo-plastic materials.

In the past, formation of boat hulls using thermo-plastic material by vacuum forming methods have been unsuccessful as a result of significant unequal stretching of the material which results in a significant reduction in the thickness of the hull at particular zones in the hull.

It is an object of this invention to provide a method of hull construction which reduces the unequal stretching of the thermo-plastic material during vacuum forming.

In one form the invention resides in a method of boat hull construction comprising mounting a former having an external configuration conforming to the internal configuration of the hull to a vacuum forming bed, heating a sheet of thermo-plastic material, supporting the heated sheet above the former by supporting one side of the sheet material on a first frame member, and supporting the opposed sides of the sheet to each side of the one side from a pair of second frame members which are pivotally mounted to the first frame member about an axis perpendicular to the plane of the sheet material, and lowering the sheet over the former and extracting air from the space between the former and sheet material.

According to a preferred feature of the invention the second frames are resiliently restrained from movement towards each other.

According to a preferred feature of the invention the rear portion of the former engaged by the unsupported side of the sheet forms the transom of the boat and has a transverse concave profile.

According to a preferred feature of the invention of the previous feature the former is provided with a panel member having an edge of complementary profile to the face of the rear portion of the former wherein said panel is moved to overlie the formed sheet material beyond said portion to clamp it to the bed wherein said edge is closely adjacent said rear portion.

In another form the invention results in a vacuum forming apparatus having a vacuum forming bed, a former supported on said bed, said former having the external configuration conforming to the internal configuration of a boat hull, a thermo-plastic sheet support comprising a first frame member and a pair of second frame members pivotally supported from the first frame member to define a substantially square or rectangular planar space having an open side whereby said second frame members are pivotally movable towards each other said first and second frame members are adapted to clampingly support a sheet of thermo-plastic material.

According to a preferred feature of the invention the second frame members are resiliently restrained from pivotable movement towards each other.

According to a preferred feature of the invention the rear portion of the former engaged by the unsupported side of the sheet forms the transom of the boat hull and has a transverse concave profile.

According to a preferred feature of the previous feature the apparatus further comprises a panel member having an edge profile complementary to the profile of the rear portion of the former, said panel being movable to a position overlying the vacuum forming bed with its edge closely adjacent the rear portion of the former.

The invention will be more fully understood in the light of the following description of one specific embodiment. The description is made with reference to the accompanying drawings of which.

Figure 1:
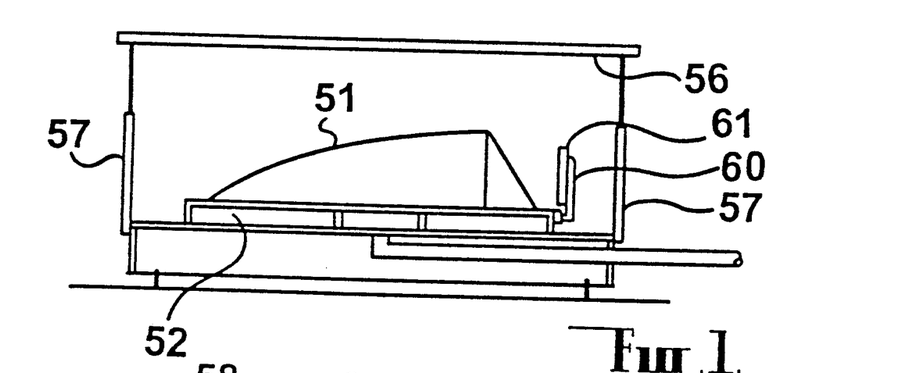
FIG. 1 is a schematic sectional elevation of a forming installation according to the embodiments.
Figure 2:
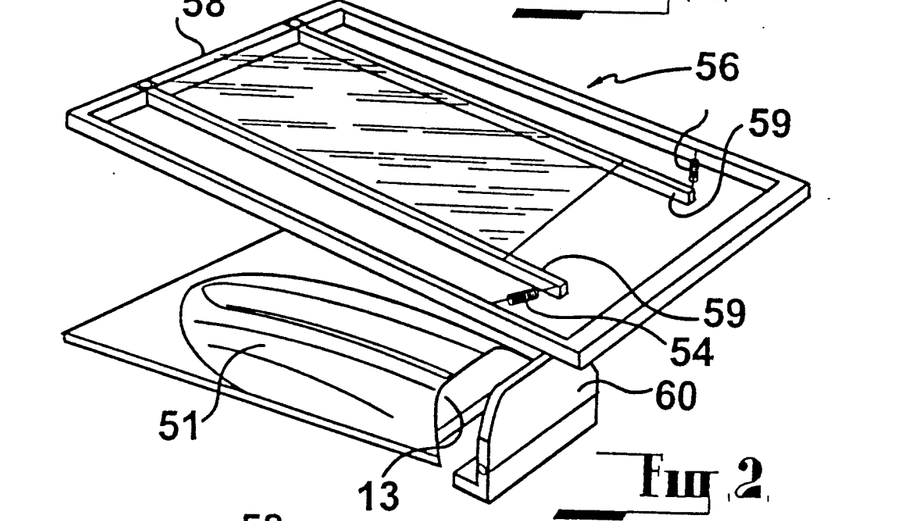
FIG. 2 is a schematic isometric view of the former and support frame according to the embodiment prior to application of the sheet material over the former.

The embodiment relates to a method of construction of a boat hull utilising thermo-plastic sheet material by a vacuum forming process. To form the boat hull a former 51 having the desired configuration of the boat hull is produced whereby the transom 13 has a substantially transverse concave configuration. The former 51 is applied to a vacuum bed 52 which is of a substantially conventional form to that used in the vacuum forming of thermo-plastic sheet material. The rear edge of the former 53 adjacent the rear portion of the former which forms the transom 13 of the boat hull supports a panel 60 which is pivotable about a transverse axis. The free edge of the panel has an edge 61 complementary to the profile of the rear portion such that when the panel is pivoted to overlie the vacuum bed 52 the edge lies closely adjacent to the rear portion of the former.

Figure 3:
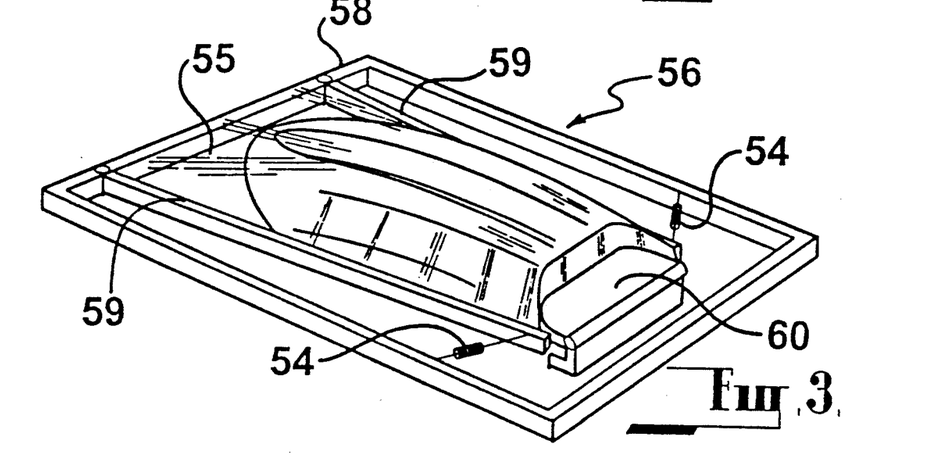
FIG. 3 is a schematic isometric view of the former and frame member subsequent to the application of the sheet material over the former.

The vacuum table 53 is associated with a substantially rectangular frame 56 which is supported above the vacuum table by a plurality of supports 57 such as jacks which enable the frame to be lowered onto the vacuum table 53 or raised therefrom. The frame 56 has a first frame member 58 which pivotally supports a pair of second substantially parallel frame members 59 which extend the length of the vacuum bed 52. Each second frame member 59 is pivotally mounted to the first frame member about a transverse axis thereof. The second frame members are connected to the support frame 16 by a set of springs 54 to control the movement of the second frame members 59 towards each other. The first and second frame members 58 and 59 are adapted to clampingly engage a sheet of thermo-plastic sheet material 55. In use the frame member 56 is raised from the vacuum table 53 and a sheet of thermo-plastic sheet material is fixed to the first and second frame members such that one end is clamped to the one end 58 of the frame member 56 and the sides are clamped to the respective second frame members 59. The sheet material is then heated by known means which may comprise a convection oven or infrared radiation and when heated sufficiently it is lowered over the former whereby due to the plasticity created as a result of the heating of the sheet 55 it will drape over the former 51 to substantially conform to the shape thereover. Air is then extracted from the space between the former and the sheet material 55 by utilisation of the air extraction means on the vacuum table 52 which causes the sheet material to closely conform to the configuration of the former. To form the transom the panel 60 is pivoted to overlie the sheet material overlying the vacuum bed 52 to the rear of the rear portion of the former and between the second frame members to shape the sheet to the desired configuration of the transom as formed by the rear portion of the former prior to the application of the vacuum.

On lowering the frame 56 over the former 51 the portion of the sheet 55 supported by the one end of the frame 58, and the adjacent portions of the side frames 59 is stretched upon it engaging the portion of the former which corresponds to the intended bow of the boat. The configuration of this portion of the former is substantially continuous and therefore the degree of stretching applied to this sheet material is also substantially continuous. The unsupported side of the sheet material 55 will drape over the transom portion of the former and as a result of that draping motion the side second frame members 59 will move inwardly against the biasing force provided by the spring members 54 to ensure that there is substantially minimal unequal stretching of the sheet material as it bends to conform to the edges provided by the junction between the transom 52 and the sides and bottom of the hull and the application of the panel 60 over the vacuum bed to the rear of the former. Upon the sheet material having draped in to substantial conformity with the former the extraction of air between the former and the sheet material serves to finalise such conformity. By allowing the sides of the sheet material in the region of the unsupported end to move inwardly during the draping process ensures that there is a minimum of stretching of the sheet material to the zones of discontinuity in the shape thereof to avoid a significant reduction in thickness of the moulded hull at such zones.

As shown in the drawings the boat hull 11 produced by the embodiment has a bow of substantially conventional configuration while the transom 13 is curved inwardly about at least two substantially upright axes to either side of the transom whereby two rearward extensions 14 are provided at each side of the hull.

Figure 5:
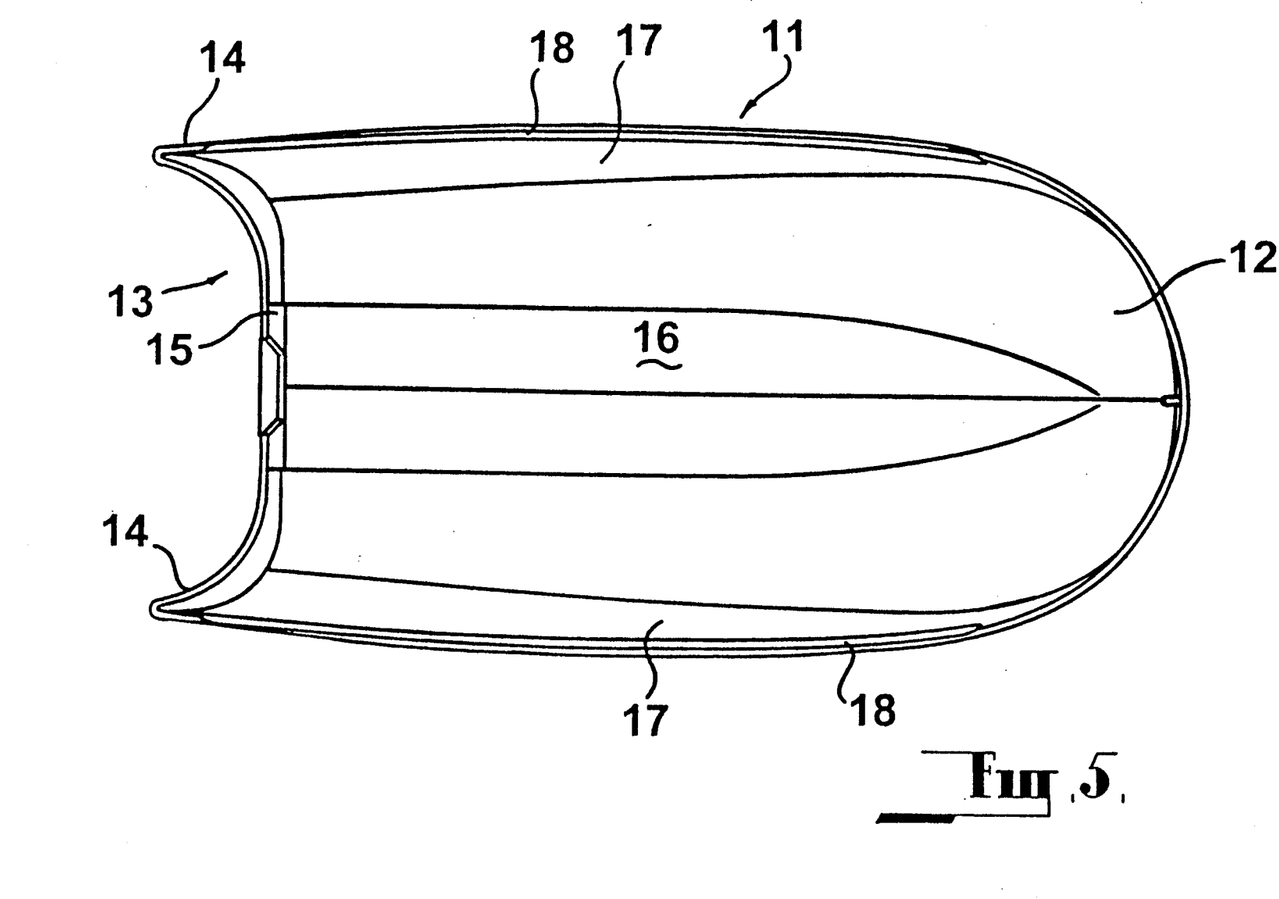
FIG. 5 is an inverted plant view of a boat hull according to the embodiment.
Figure 8:
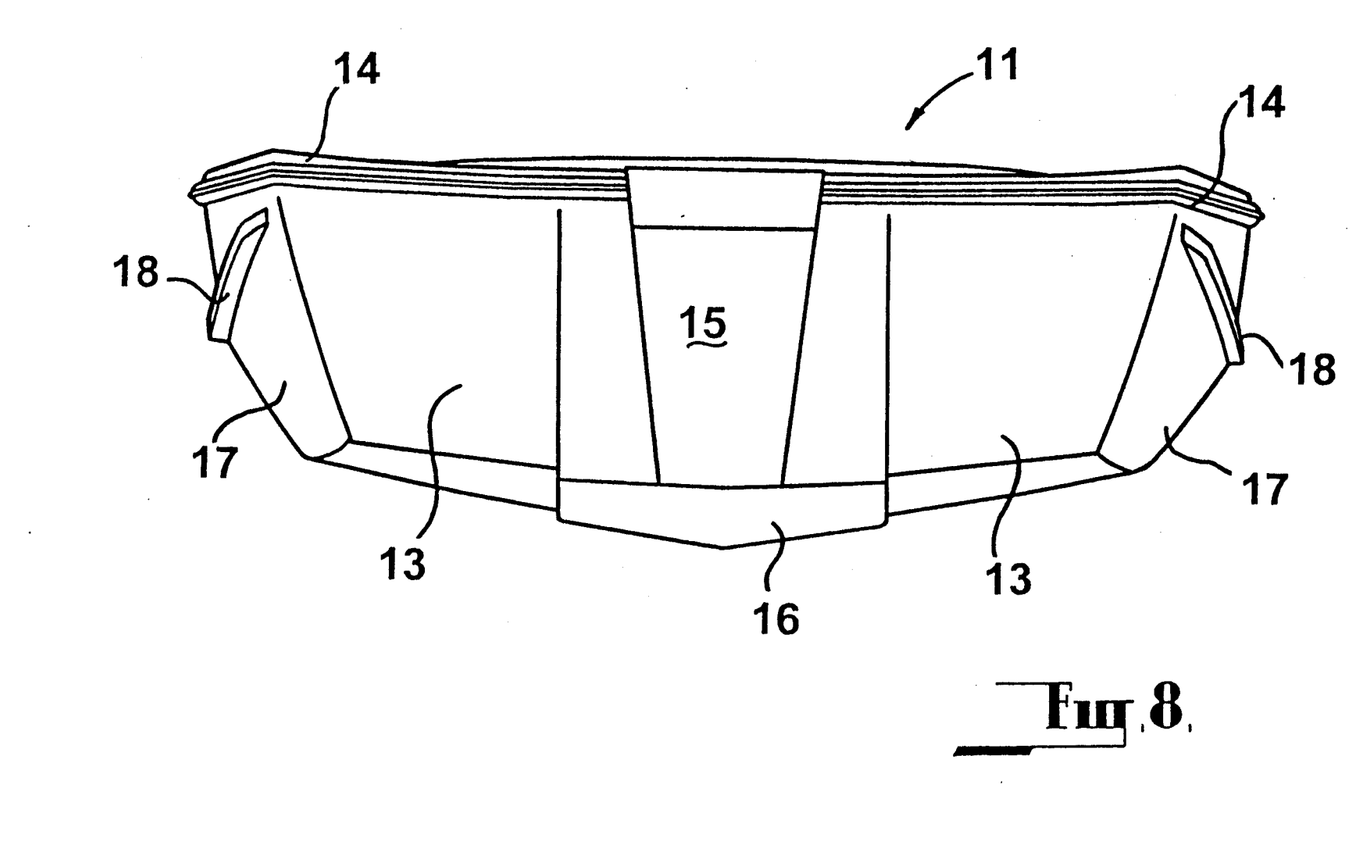
FIG. 8 is a rear elevation of a boat hull according to the embodiment.
Figure 9:
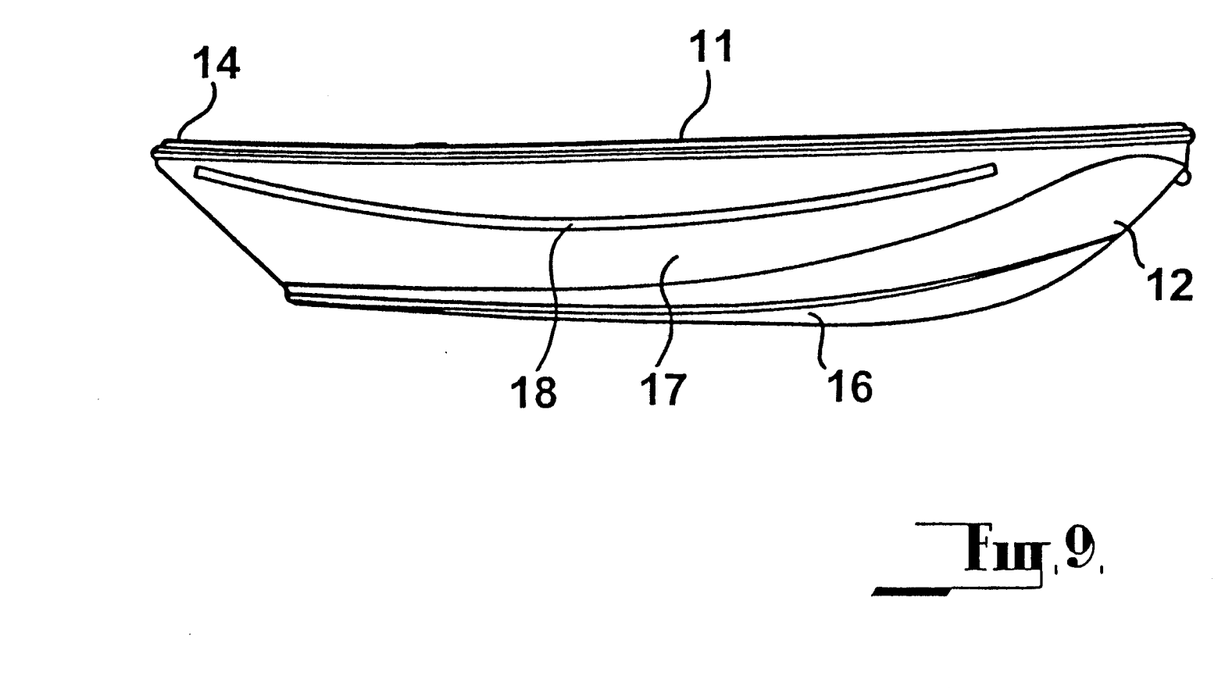
FIG. 9 is a side elevation of a boat hull according to the embodiment.

A central portion 16 comprising a longitudinal raised panel extending to each side of the central axis which extends for substantially the full length of the hull and is symmetrical about the longitudinal axis is provided along the bottom of the hull. The central portion of the transom 13 is formed with an inwardly stepped portion 15 which is of convergent depth between the upper edge of the transom and of the central portion 16. The presence of the stepped portion 15 in the transom is provided to compensate for the presence of the central portion 16 in the bottom of the hull during the vacuum forming process to minimise the degree of stretching of the thermo-plastic sheet material in the junction of the fledged portion with the transom 13.

Figure 4:
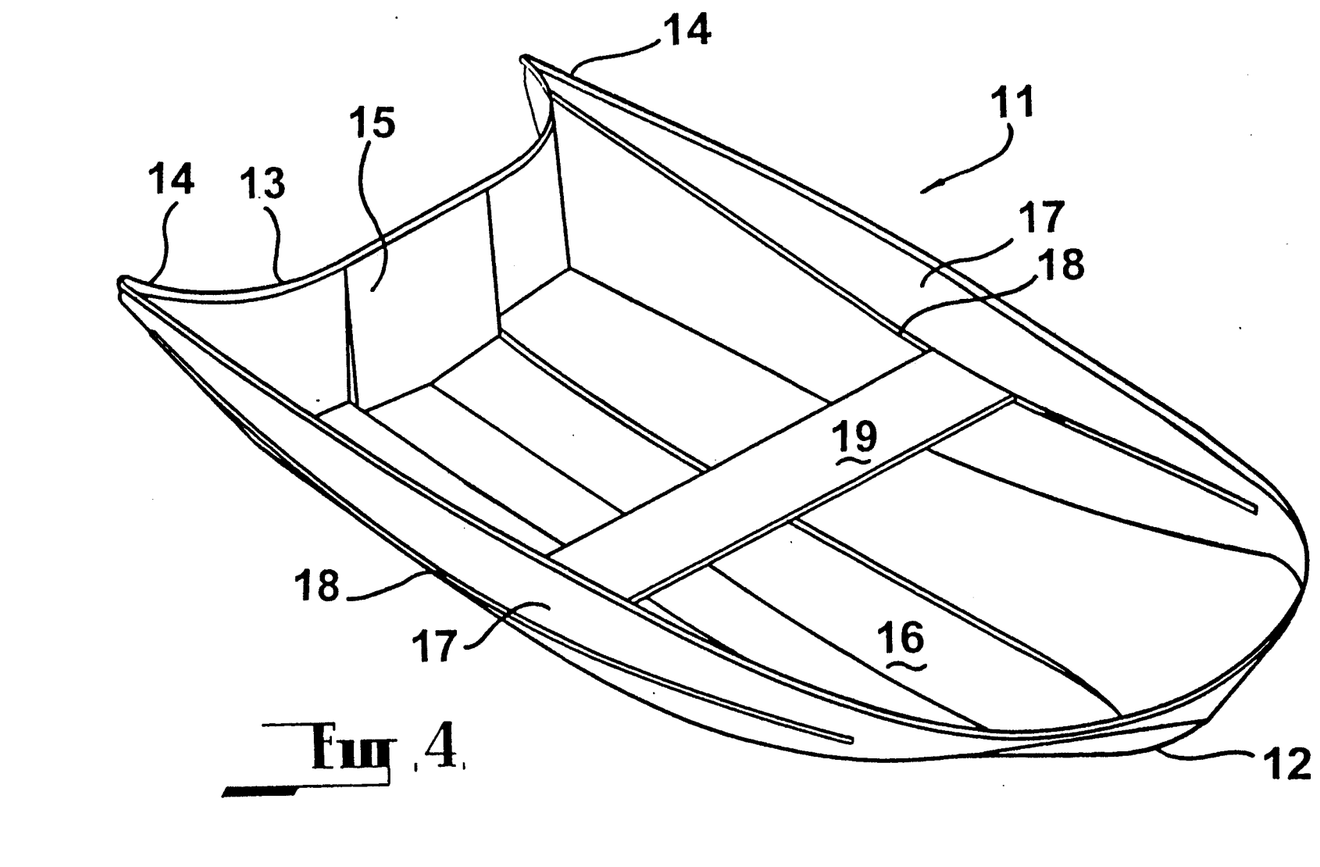
FIG. 4 is an isometric view of a boat hull according to the embodiment.
Figure 6:
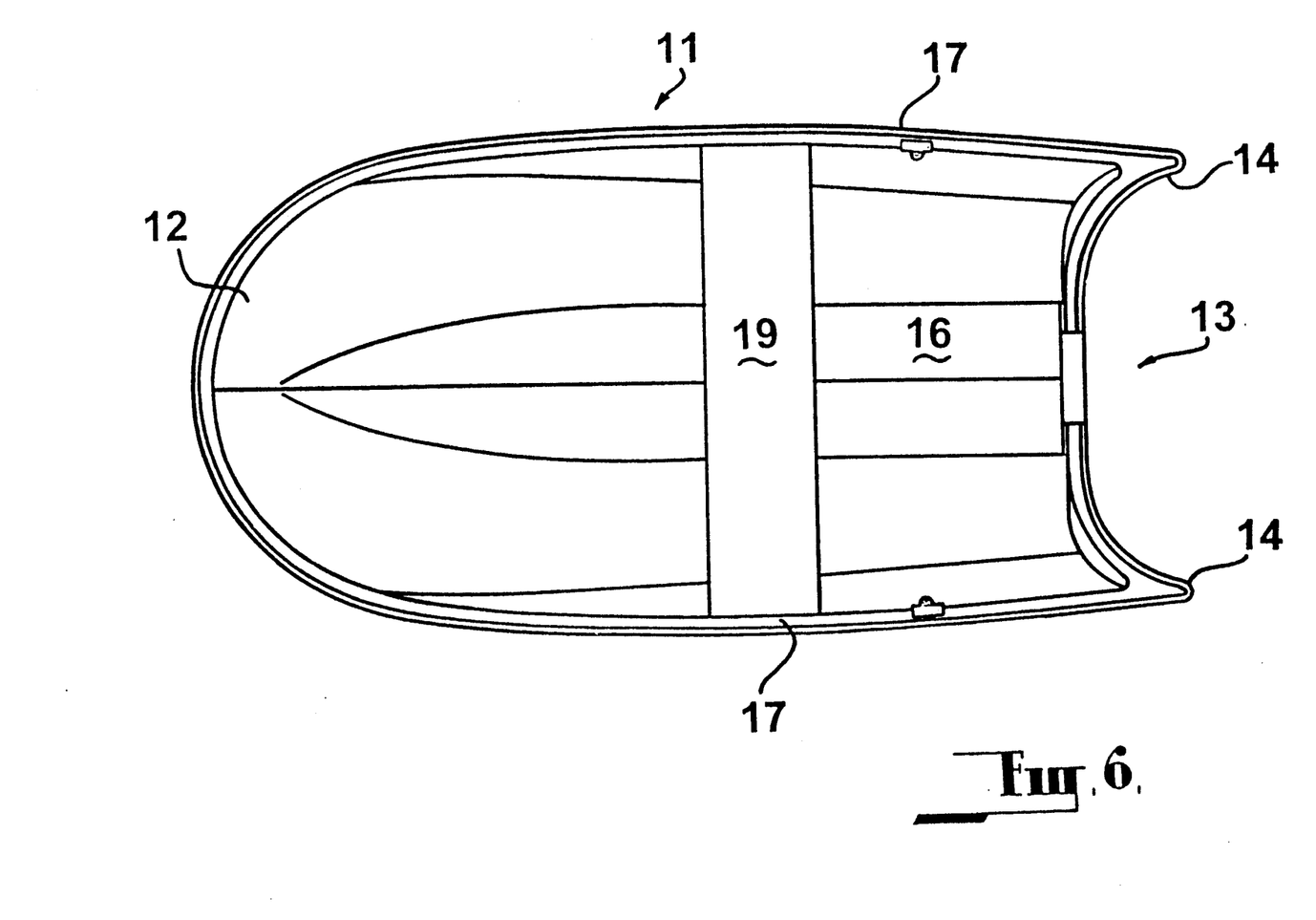
FIG. 6 is a plan view of a boat hull according to the embodiment.
Figure 7:
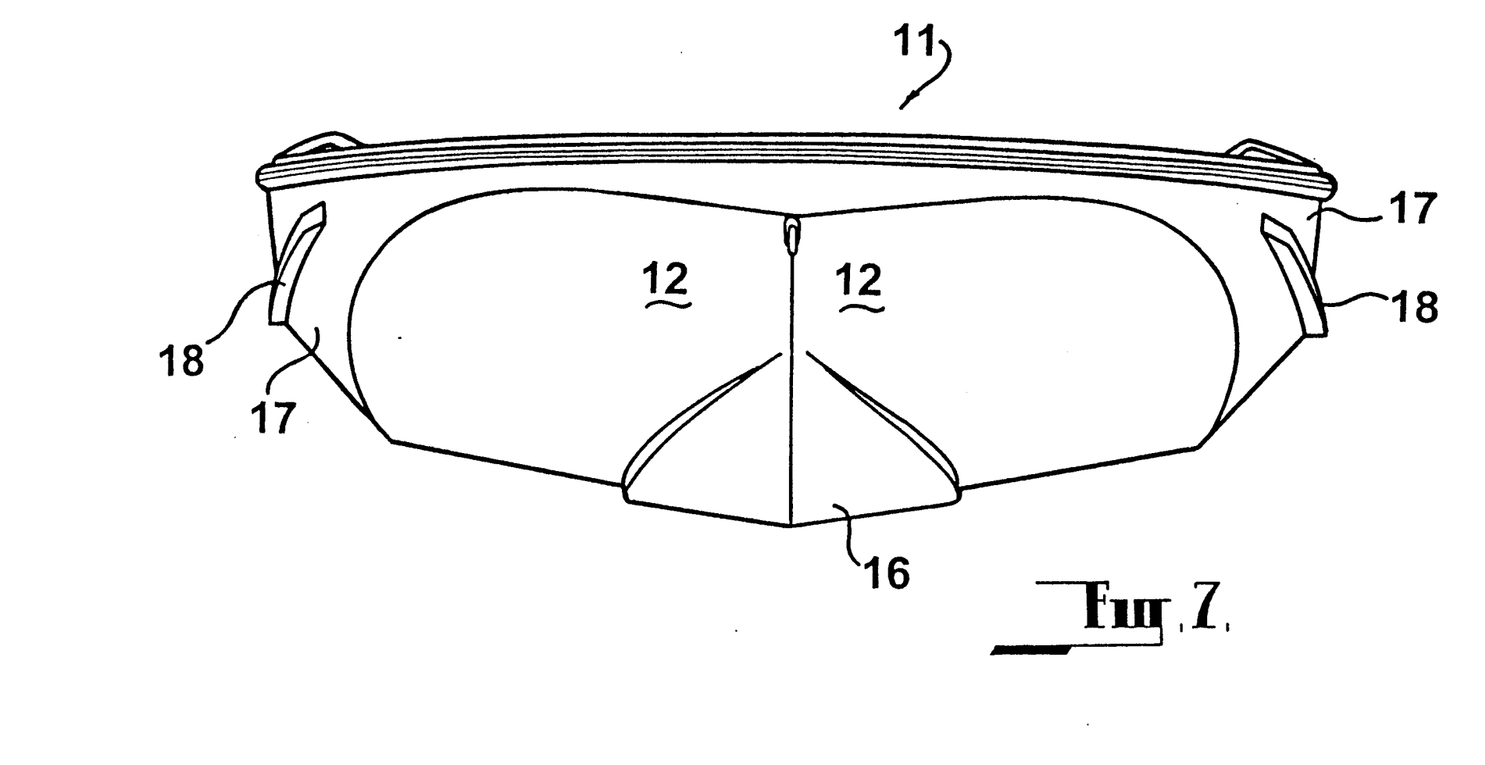
FIG. 7 is a front elevation of a boat hull according to the embodiment.

Each side 17 of the hull is formed with an outwardly extending rib 18 which extends substantially the full length of the hull and is formed by a channel member provided on the former and which is removable from the former on removal of the formed hull therefrom. On removal of the hull from the former, the channel member is then removed from the formed hull to provide a channel-shaped recess on the internal face of the side wall 18. The channel-shaped recess provided by the internal face of the rib 18 is used to accommodate a thwart 19 which is located by being resiliently deformed on introduction into the channel between the side 17 of the boat hull and is subsequently riveted into place.

The presence of the rearward extensions 14 to each side of the hull 11 as a result of the inwardly curved transom 13 serve to increase the buoyancy of the hull at the rear portion thereof. The presence of such buoyancy serves to counteract the tendency of the transom 13 to sink lower in the water on the presence of a load thereat as a result of the presence of an outboard motor and/or occupant at the rear of the boat. In addition, the presence of a curved transom serves to move the weight of the outboard motor forwardly in relation to the overall length of the boat and serves to protect the outboard motor from physical damage when the hull is moored at jetties and is adjacent to other boats.

The presence of the central portion 16 in the bottom of the boat hull serves to enhance the lateral stability of the hull when moving through the water and ensures substantially direct tracking of the boat hull in its movement to reduce the degree of sidewards "slip" of the boat hull when changing direction.

It should be appreciated that the scope of the present invention need not be limited to the particular scope of the embodiment described above.

It will be appreciated that the hull may take any suitable configuration. If desired the ribs 18 may be replaced by an inwardly directed step spaced downwardly from the gunwale which can support the thwarts. In addition the thwarts can be associated with buoyancy cells fixed between the underneath of the thwart and the boat hull. In addition the central portion 16 and the thwart 19 can be replaced by a central longitudinal rib or keel and a set of longitudinal ribs to each side thereof.

The claims defining the invention are as follows:

1. A method of constructing a boat hull from a planar sheet of thermoplastic material, said sheet having an end portion extending between two opposed side portions, said boat hull having a desired internal configuration, said method comprising:
    a) mounting a former having an external configuration conforming to said internal hull configuration to a vacuum-forming bed;
    b) heating said sheet of thermoplastic material;
    c) supporting said heated sheet above said former on a frame by supporting said end portion on a first frame member and by supporting said opposed sides of said sheet from a pair of second frame members articulated to said first frame member in a manner permitting relative movement between said second frame members about an axis transverse to the plane of said sheet for the control of said sheet during forming;
    d) lowering said frame and sheet over said former thereby defining a space with said former; and
    e) extracting air from said space between said former and said thermoplastic material sheet to conform said sheet to said former.

2. A method of constructing a boat hull as claimed in claim 1 wherein said second frame members are resiliently restrained from movement towards each other.

3. A method of constructing a boat hull according to claim 1 wherein said second frame members are elongated to extend away from said first frame member and are pivotally mounted to said first frame member to be swingable towards and away from one another about said axis transverse to the plane of said sheet material.

4. A method of constructing a boat hull according to claim 1 wherein said sheet has an unsupported sheet portion extending between said second frame members remotely from said first frame member and said former has a rear portion with a transverse concave profile and wherein said rear portion of said former is engaged by said unsupported sheet portion to form a transom for said boat hull.

5. A method of constructing a boat hull as claimed in claim 4 wherein said lowered sheet extends rearwardly beyond said rear former portion and said former includes a panel member having an edge of complementary shape to a transverse profile of said rear portion of said former wherein said panel is moved to overlie said sheet material on said former beyond said portion to clamp it to said vacuum-forming bed and wherein said edge engages said sheet to hold said sheet closely conforming to said rear portion transverse profile.

6. A method of constructing a boat hull according to claim 1 wherein said second frame members are elongated to extend away from said first frame member, are pivotally mounted to said first frame member to be swingable towards and away from one another about said axis transverse to the plane of said sheet material and are resiliently restrained from movement towards each other.

7. A method of constructing a boat hull according to claim 6 wherein said sheet has an unsupported sheet portion extending between said second frame members remotely from said first frame member and said former has a rear portion with a transverse concave profile and wherein said rear portion of said former is engaged by said unsupported sheet portion to form a transom for said boat hull.

8. A boat hull constructed by the method of claim 1.

9. A vacuum-forming apparatus for constructing a boat hull by molding a thermoplastic material sheet on a former, said boat hull having a desired internal configuration, said vacuum-forming apparatus comprising:
  a) a vacuum forming bed;
  b) a former supported on said bed, said former having an external configuration conforming to said boat hull internal configuration;
  c) an open-ended frame to support and tension said thermoplastic material sheet, said frame being configured with arms to embrace said former and being lowerable around said former to apply said thermoplastic material sheet over said former, said arms having extremities defining an open end to said frame, said frame arms being relatively movable towards and away from each other;
  d) resilient means for controlling relative movement of said frame arms; and
  e) means to attach said sheet to said frame to be supported by said frame with an unsupported side at said open frame end;

whereby said sheet can be lowered over said former with tension in said sheet being controlled by resiliently controlled movement of said frame arms.

10. An apparatus as claimed in claim 9 wherein said former has a rear portion shaped with a transverse concave profile to be engaged by said unsupported side of said sheet to form a transom of the boat hull.

11. An apparatus as claimed in claim 9 further comprising a panel member having an edge shaped to be complementary to said transverse profile of said rear former portion said panel being movable to a position overlying said vacuum-forming bed with said panel member edge closely conforming to said rear former portion transverse profile.

12. An apparatus as claimed in claim 9 wherein said frame comprises a first frame member and said frame arms are constituted by a pair of second frame members pivotally secured to said first frame member to define a substantially rectangular planar space having an open side.

13. An apparatus as claimed in claim 9 wherein said frame includes side members extending alongside and outwardly of said arms, said resilient controlling means acting between respective ones of said side members and said arms.

14. An apparatus as claimed in claim 13 wherein said frame includes side members extending alongside and outwardly of said arms, said resilient controlling means acting between respective ones of said side members and said arms.

15. An apparatus as claimed in claim 14 wherein said former has a rear portion shaped with a transverse concave profile to be engaged by said unsupported side of said sheet to form a transom of the boat hull.

16. An apparatus as claimed in claim 15 further comprising a panel member having an edge shaped to be complementary to said transverse profile of said rear former portion, said panel being movable to a position overlying said vacuum-forming bed with said panel member edge closely conforming to said rear former portion transverse profile.

* * * * *